(12) United States Patent
Call et al.

(10) Patent No.: US 9,593,705 B2
(45) Date of Patent: Mar. 14, 2017

(54) STEEL STUD ANCHOR

(71) Applicants: Franklin Jiri Call, Pickering (CA); Mark Robbeson, Toronto (CA)

(72) Inventors: Franklin Jiri Call, Pickering (CA); Mark Robbeson, Toronto (CA)

(73) Assignees: Franklin Hall, Ontario (CA); Mark Robbeson, Ontario (CA)

(*) Notice: Subject to any disclaimer, the term of this patent is extended or adjusted under 35 U.S.C. 154(b) by 0 days.

(21) Appl. No.: 14/632,966

(22) Filed: Feb. 26, 2015

(65) Prior Publication Data

US 2015/0247519 A1 Sep. 3, 2015

Related U.S. Application Data

(63) Continuation-in-part of application No. 14/194,679, filed on Mar. 1, 2014, now abandoned.

(51) Int. Cl.
*F16B 35/04* (2006.01)
*F16B 25/00* (2006.01)
*F16B 25/10* (2006.01)
*F16B 23/00* (2006.01)

(52) U.S. Cl.
CPC ........ *F16B 25/0021* (2013.01); *F16B 25/103* (2013.01); *F16B 23/0007* (2013.01)

(58) Field of Classification Search
CPC .............. F16B 23/0007; F16B 25/0021; F16B 25/0084; F16B 25/10; F16B 25/103; F16B 35/04
USPC ... 411/80.1, 366.3, 372.5–372.6, 383, 387.1, 411/387.8, 411
See application file for complete search history.

(56) References Cited

U.S. PATENT DOCUMENTS 1,194,792 A * 8/1916 Stewart .................. B42F 13/12
411/178
2,627,778 A * 2/1953 Hodell ..................... A47G 3/00
261/DIG. 38

(Continued)

FOREIGN PATENT DOCUMENTS

WO WO9905420 2/1999
WO WO2014026051 2/2014

OTHER PUBLICATIONS

International Search Report issued in corresponding International Application No. PCT/IB2015/000600. Dated Sep. 22, 2015.

*Primary Examiner* — Roberta Delisle
(74) *Attorney, Agent, or Firm* — Davidson, Davidson and Kappel, LLC

(57) ABSTRACT

A metal anchoring fastener fastens millwork onto walls constructed with wall cladding fastened to steel studs. The load typical of a loaded cabinet is borne by the steel stud anchors owing to the mate between the profile of the steel stud anchor and the layers of millwork and wall cladding and steel stud that said anchor penetrates. The pitch of the thread adorning the profile of the steel stud anchor progresses non-linearly along the length of said shaft, the shaft is generally non-linear in profile, and the thread profile is non-uniform along the length of said shaft. The anchor can also support a secondary screw concentrically penetrating the void at the center of the anchor, in order to hang loads from a wall, with or without millwork. Predrilling of the holes can enable installation of these zinc anchors.

32 Claims, 11 Drawing Sheets

(56) References Cited

U.S. PATENT DOCUMENTS

| | | | |
|---|---|---|---|
| 2,771,262 A * | 11/1956 | Laystrom | F16B 5/0258 174/138 D |
| 3,461,772 A * | 8/1969 | Barry | F16B 13/126 411/80.1 |
| 3,482,482 A * | 12/1969 | Sage | F16B 13/00 411/80.1 |
| 4,653,244 A | 3/1987 | Farrell | |
| 5,603,472 A * | 2/1997 | Hutter, III | B64C 1/12 244/132 |
| 5,788,442 A * | 8/1998 | Eder | F16B 37/14 411/372 |
| 6,302,630 B1 * | 10/2001 | Grant | A47G 3/00 411/372.6 |
| 6,315,485 B1 * | 11/2001 | Speck | F16B 37/14 244/132 |
| 6,361,258 B1 * | 3/2002 | Heesch | F16B 23/0084 411/178 |
| 6,371,707 B1 * | 4/2002 | Schaty | F16B 37/0842 411/171 |
| 6,419,436 B1 | 7/2002 | Gaudron | |
| 6,641,343 B1 * | 11/2003 | Duran | F16B 19/109 411/348 |
| 6,679,661 B2 * | 1/2004 | Huang | F16B 13/002 411/178 |
| 7,934,895 B2 * | 5/2011 | Ernst | F16B 13/002 411/29 |
| 7,980,801 B2 * | 7/2011 | Kawano | F16B 23/00 411/399 |
| 9,086,085 B2 * | 7/2015 | Lubchansky | F16B 23/0007 |
| 2004/0057810 A1 * | 3/2004 | Breslin | F16B 13/126 411/383 |
| 2005/0079027 A1 | 4/2005 | Ernst et al. | |
| 2006/0018730 A1 * | 1/2006 | Ernst | F16B 13/002 411/31 |
| 2008/0014047 A1 | 1/2008 | Dohi | |

\* cited by examiner

STEEL STUD ANCHOR

FIELD OF THE INVENTION

This Invention relates generally to fasteners and more particularly to fasteners detailed to anchor in steel studs supporting walls in buildings.

BACKGROUND OF THE INVENTION

For generations, homes were framed with timber, with the interiors clad in drywall or some sort of wallboard. In a traditional wood-framed home, hanging things from the walls was neither difficult nor precarious. Mainly 2"×4"s and 2"×6"s were used. After the framing was finished, drywall or some wall board surface would be attached to the framing members, it would be painted and then the millwork would be attached, such as a kitchen cabinet, a bathroom vanity, book cases etc. These solid wooden studs were sturdy and the process, although wasteful, allowed builders and homeowners alike to easily fasten millwork and other heavy objects to walls by using a wood screw to connect the millwork to the structural timber framing members of the home. The solid wood stud provided plenty of surface contact to a fastener or wood screw and plenty of tensile strength to hold the fastener or wood screw in place and support the weight of e.g. cabinets and shelves being fastened to the walls. The use of a solid wood stud and a properly sized wood screw remains the preferred and usual method to install carpentry and millwork.

Wood screws typically have a straight shaft or body with a consistent diameter having a pointed tip at on one end and with a regular spaced thread winding its way up the shaft to the head of the screw located at the end opposite the pointed tip. Wood is somewhat elastic and tends to hold its form. The straight shaft and regular thread of the wood screw in turn allows the screw to squeeze between the wood fibers of a solid wood stud, giving plenty of surface contact between the wooden framing member and the screw and allowing the wood stud to hold it along its whole surface. This is why wood screws in wood framed homes work well.

Many other kinds of threaded fasteners exist with these fasteners being distinguished by their varied tightening features, shaft profiles, thread pitch, thread profile, terminal piercing and cutting features and the materials the fasteners are made of. For example, sheet metal screws designed for use with sheet metal are also known. These screws are similar to wood screws in that they typically have a straight shaft, consistent diameter leading to a pointed tip and a regularly spaced thread.

When a lighter object is to be hung, a drywall anchor can used instead. With its small pilot hole, a drywall anchor can be twisted straight into wall board regardless of the location of stud. In fact, it is preferable when using wall anchors to avoid the wood studs entirely as they are designed to be applied strictly to drywall. However, drywall anchors are generally load rated at only around 50 lbs.

In recent years, builders have begun using steel framed partitions in structures like condominiums and commercial towers. Steel stud construction is popular with builders of condos, offices and even some homes because it saves lots of time and materials for builders and homeowners alike, resulting in cost savings and more efficient use of labor. Most high-rise structures in cities today are framed this way.

Steel stud construction is not without its problems, however. For example, the light gauge and weight of the steel studs has made it extremely difficult and time consuming to fasten most things to walls. (e.g. cabinets, shelves, artwork, large screen televisions, pictures). A typical interior partition framed with steel studs has a drywall face just like the wooden framed wall but the studs inside are hollow and quite flimsy. Viewed in section from above, a steel stud looks like the letter "C", as steel studs are closed on 3 sides and hollow. Steel studs only become structurally strong when fastened to the cement slab above and below (or the floor and ceiling) as well as attached to the other framing members, drywall or wallboard. In other words, steel framed structures become strong when assembled in unison with the other building components.

Conventional wood or sheet metal screws were not designed for use with a thin, hollow steel stud because the steel stud offers little surface contact/contact substance for the screw threads to hold on to. When coupled with the fact that the steel studs are quite malleable and easily distorted, the result is a poor match of fastener and framing member. The wood and sheet metal screws stretch the hole they make in a steel stud and then can't be properly snugged up. Further, the wood and sheet metal screws strip easily and they do not secure well to the sheet metal that is within a wall. As a conventional metal or wood screw is tightened in a steel stud, it winds in adequately, but when an attempt is made to turn the thread a final time to secure the screw in the steel stud, the metal of the steel stud is displaced and the slender straight screw easily slips loose.

Drywall anchors designed for use in drywall, are no better in steel studs. Drywall anchors are designed to cut into the gypsum wall board and hold tight like a plug. These screws are often too short to reach the steel stud behind the drywall. When they can be threaded into a hole in a steel stud, they have similar issues as wood and sheet metal screws, such as tearing of the hole and stripping of the screw. Further, drywall anchors are only rated for light weight applications.

To address the problem of fastening millwork to steel studs, builders have come up with a number of work-arounds, but these work-arounds have proven time consuming and costly, with none addressing the problem directly or effectively. A commercial builder often winds up applying a layer of plywood behind the drywall on the face of the steel studs to give the millwork installers something to screw the cabinets to. In other cases, the studs are cut and altered and a strip of plywood is placed along the face of the studs behind the drywall. These alternatives are slow, time consuming, indirect and also quite pricey, not to mention inferior to simply screwing into wooden studs. A contractor installing anything heavy in a steel framed home or office likely will need to open the wall and pack some wood of their own inside the framing behind the drywall to give something to screw into that will hold fast. This means that before e.g. the millwork can be installed, the wall must first be cut open, the wood put inside and then the drywall must be painted and plaster repaired. Builders have also used combinations of construction adhesives and toggle bolts or butterfly clips applied through the drywall to hang e.g. millwork, but these still are only rated for only about 250-275 lbs depending on the gauge of the hardware.

Thus, there is a need for a fastener that can fasten securely in a steel stud and can secure heavy objects, such as large TV's, cabinets and bookshelves.

As discussed in the present application, "millwork" refers to a wooden wall furnishings, including bookshelves and cabinets. "Wall cladding" refers to a plurality of generally planar materials fastened vertically to vertical support studs, exemplified by gypsum wallboard. "Steel studs" are vertical struts formed by the folding of sheet metal to resist bending.

When fastened from floor to upper beam, said steel studs form walls to which wall cladding, generally gypsum wallboard, and millwork, such as cabinets, are applied. An "anchor" refers to a fastener that forms a mate with a substrate, such as drywall to bear a load. The "mate" refers to the piercing and threading into a substrate of a threaded fastener, also called a "screw", exemplified by a screw mated to a wall by driving it in with a screwdriver, whether manual or power-driven. "Linear" describes the relationship of a dependent variable increasing in a straight line function with an increase in the independent variable. "Non-linear" refers to the relationship function described by a curve.

The "tightening features" refers to the openings in the head of a fastener into which a drive bit is fitted to enable rotation of the screw head, with the screw head being a flanged accoutrement crowning a threaded shaft. The "shaft profile" describes the change of diameter of the shaft down the length of the shaft. Known shaft profiles include a shaft with a meeting of two straight lines, a "linear" shaft, or two curves (i.e. "non-linear" shaft). Generally conical shafts equipped with helical threads will translate a rotational force applied to the head into a perpendicular linear displacement into the material to which the fastener is applied. The "thread pitch" describes the number of rotations of the thread per linear unit of shaft length. An "aggressive" thread has a widely spaced helical ridge. Thread can be "linear", that is, unchanging along the length of the shaft, or "non-linear", wherein the thread count varies along the long axis of the fastener shaft. "Thread profile", the cross-sectional shape and dimensions of the thread ridge as it winds around the shaft, can be uniform or non-uniform along the thread helix. Changing thread pitch and thread profile along the shaft can result in different qualities of mate between the fastener and the material being fastened into. The choice of "materials" can affect the hardness, brittleness, and tensile strength of the fastener, all of which will determine the quality of the mate with the substrate into which the fastener is fastened. Finally, at the terminal point of the shaft a plurality of "cutting" features and "piercing" features can be incorporated to add the entry of the fastener into the substrate. Said cutting and piercing features are affected by materials and geometry.

Lopez (U.S. Pat. No. 4,473,984: Oct. 2, 1984) presents a threaded stud that is meant to penetrate any masonry, wood, or steel stud wall to present a loop transverse to the stud thread helix emanating from the wall said threaded stud has penetrated. While no claims or description are made of the threaded stud, the patent specification does identify that the manner of thread and cutters can influence the thread mate. Diagrams for this patent indicate a threaded stud or shaft that is identical in cross-section from base to just before the conical pointed tip. Non-linear shaft profiles, linear thread pitch progressions, non-uniform progression of thread profile are all not discussed in terms of their influence on mate between the anchor and the wall. The threaded stud of the Lopez patent would not be suitable for fastening with a steel stud for the same reasons as a wood screw or sheet metal screw. The thin steel stud would distort easily with the described threaded stud with the point of entry (pilot hole) being easily displaced, such that this fastener would lose its grip and not secure properly Bui (U.S. Pat. No. 8,601,763: Dec. 10, 2013) describes a novelty specific to the metal studs discussed in this Application. The rivets or screws of the Bui patent purportedly connect a thin concrete slab to a metal frame. Thus, the Bui patent describes a rivet to be applied between ribs of a steel stud into screws supported a concrete panel can be drilled. This static implementation of a mate in the steel stud itself presupposes the ability to find this mate rivet when hanging the wall cladding to the steel studs. Such a fastener is very specifically designed for mating concrete to metal and would not be appropriate for e.g. drywall as it would break apart the drywall and therefore would not tighten properly in a steel stud application.

Katsumi (U.S. Pat. Application 20060228186: Oct. 12, 2006) presents a self-tapping stainless steel screw with a built-in fracture line to remove the drill head when drilling steel sheets for rooves and walls. What the steel sheets are being affixed to is not specified. No special attention is given to the thread, the thread profile, and the shaft profile, and the material used is not zinc. Such a fastener would not be suitable for fastening with a steel stud for the same reasons as a wood screw or sheet metal screw. The screw of the Katsumi patent is designed for use with heavier gauge studs, for example the kind used in roofing truss, which is much heavier/thicker than the steel studs used behind an apartment's walls. The straight shaft and even threads of this screw would strip easily in a steel stud. Further, these screws would work well in shear forces but would not tension, because the cross section of the amount of material the threads grab is minimal.

SUMMARY OF THE INVENTION

This Application describes how the structure of the novel steel stud anchor fastener constituting the Invention enters and, as it enters, alters the millwork, wall cladding, and steel stud to form a load-bearing mate. Accordingly, it is an objection of this invention to at least partially overcome some of the disadvantages of the prior art.

The problems with obtaining a fastener that will securely hold significant amounts of weight in a steel stud have been solved by the steel stud anchor of the present invention. The present arrangement utilizes a helically threaded generally conical fastener equipped with tightening features in the head and piercing features in the point that enable the fastener to be drilled through a wall and anchor to the steel stud supporting said wall. Pre-drilling a hole in preparation to drilling the anchor into the wall is also an installation option for this anchor.

In preferred embodiments, the steel stud anchor has a unique concave profile of the shaft coupled with an unusual auger-like thread style and progression which causes the steel stud to curl around the anchor and hold it fast. This allows for a far superior grip.

In certain embodiments of the present invention, the threads on the shaft are provided with an increased profile which makes them resistant to stripping when threaded into a steel stud hole. In further embodiments, the threads near the bottom of the shaft of the anchor (near the pointed tip) are closer together and become farther apart toward the top of the anchor shaft (near the head). With this configuration, as the anchor is screwed into the steel stud, the threads are at first close together and then as it is wound in further, the threads are thicker and further apart, such that the threads are used to shape the metal of the steel stud surrounding the anchor shaft much like the way an ice cream scoop curls the ice cream while scooping. The anchor can be applied directly through the millwork, the drywall and directly into the existing steel studs with no need for bulking up the wall with wood. Further, the studs of the present invention are therefore capable of securing far greater weights in less time with less skill and hassle.

With its different profile and thread style, the steel stud anchor of the present invention functions differently from prior art wood and metal screws. As the steel stud anchor is threaded into a steel stud, the increasing diameter of the shaft of the anchor pulls the hole in the steel stud open while the anchor threads also begin to tightly curl the displaced metal of the steel stud around the anchor, making the point of entry stronger. This increased surface area around the anchor also allows for more surface contact between the anchor and the steel stud, giving it a much greater grab or purchase. Where previously known fasteners are easily stripped when inserted into steel stud, it is extremely difficult to strip the steel stud of the present application when it is threaded into a steed stud. The greater grab or purchase without stripping, in turn, enables the anchor to deliver load ratings many times greater than anything else currently on the market. In certain embodiments, the steel stud anchor of the present invention can hold approximately four times the load of the known prior art fasteners. The steel stud anchor of the present invention can, in certain embodiments, hold up to about 1000 lbs. In certain other embodiments, the steel stud fastener can hold greater than 1000 lbs securely. The ability to directly fasten the steel stud anchor to a steel stud saves a massive amount of labor and delivers a far superior attachment of heavy components to walls.

In certain embodiments, the steel stud anchor includes a self-drilling tip, allowing professionals to move more quickly and shoot the anchor directly through the drywall, without drilling. In certain embodiments, a blade is located adjacent to the pointed end. In preferred embodiments, the blade is a small sharp flange that sits just adjacent and slightly recessed up the shaft from piercing tip of the anchor. As the anchor spins during its insertion, the sharp flange scores the steel stud's surface, assisting the tip in piercing the stud. In a preferred embodiment, the blade is approximately ⅛" in length. In other embodiments, a pilot hole can first be drilled before inserting the steel stud anchor. In certain preferred embodiments, the pilot hole is approximately 3/16" in diameter. The steel stud anchor of the present invention can be made in a variety of sizes, for example, with a length of 3.5", 3", 2.5", and 2". In preferred embodiments, the length of the anchor is a general purpose size of 3.5".

The anchor can also be provided with a secondary thread that adjacent the head of the anchor and leads in to the primary thread discussed above. In preferred embodiments, the secondary thread extends for approximately ½" below the head of the anchor. The secondary thread is slightly grooved to help it move more easily through e.g. drywall or millwork. The spacing of the threads of the secondary thread are wide enough to allow for the thickness of a sheet of drywall. The purpose of the slightly grooved secondary thread is to keep e.g. the displaced drywall or millwork (detritus) tightly packed as the anchor is screwed into a wall to prevent the exposed surface of the wall or millwork from blistering.

Once twisted tightly into the steel stud, the steel stud anchor can also be used as an anchor itself, such that in certain embodiments, a smaller screw can be inserted, if desired. The steed stud anchor can also be used in conjunction with a variety of hooks, clips, hangers and anything else desired to be screwed in to a wall. The steel stud anchor can also be easily removed, unlike toggle bolts or butterfly clips.

In a preferred embodiment, the steel stud anchor of the present invention is about 3.5" (about 8.9 cm) in length and can be about 17 mm or about ⅝" across the head. The shaft below the head is about ⅜" or about 9.5 mm in diameter. In preferred embodiments, the taper (radius) and thread frequency (pitch) follow the relationship shown in FIG. 7 which is based on a standard 3.5" (about 8.9 cm) in length anchor. For example, in certain preferred embodiments, an anchor with a 3.5" length has an about 3/16" diameter thread at the pointed tip end of the shaft and increases up to a diameter of about ⅝" at the head end of the shaft.

However, the increase of the diameter is not a linear progression. The change in radius size from the tip to the head is generated using a Formula I discussed in the detailed description below. The anchor designed using Formula I will have a concave curve to the shaft. The pitch of the thread (crest to crest distance) starts off at about ⅛" and increases to about 5/16" and is a linear transition (e.g. increase by a fixed multiplier, e.g. ×1.3) along the length of the threaded section. Formula I was developed to allow the small diameter of the anchor to enter the steel stud with less torque. As the anchor gets deeper into the hole in the steel stud, the steel stud is being formed around the core of the anchor that also follows the same curve as the change in radius formula (but using the minor diameter of the thread instead. As the pitch increases, so does the torque required to drive the anchor into place. Eventually, when the anchor reaches the desired depth (usually with the head of anchor flush onto the drywall), the torque is at the maximum and so is its holding strength. The thread pitch formula of Formula II (discussed in detail in the Detailed Description section below) is important to allow easy starting and maximum steel stud forming (without tearing the steel stud). The thread radius of Formula I also aids in the ease of installation and steel stud formation but also acts as an auger when being installed. As the anchor passes through the drywall and enters the steel stud, one revolution at the tip drives the anchor into the wall only about ⅛". However the part of the anchor that has not yet entered or passed through the steel stud has a larger pitch. This acts as an auger and pushes the debris from the hole in the drywall out of the way for the anchor. Eventually, the outside diameter of the area near the tip of the anchor is equal to the core diameter of the head end of the anchor creating a clean tight fit without over packing the hole.

More particularly, the steel stud anchor of the present application provides for anchoring perpendicularly into vertical steel studs in able to support e.g. wall cladding, and, optionally, millwork and other heavy items to be hung from a wall like televisions, artwork such as pictures, minors, utility hangers bike racks, audio equipment/home electronics, shoe racks, display cases, hand rails, planters, sconces, lighting fixtures, studio equipment, decorative wall panels applied on top of drywall (like in condo hallways) fire place mantel and surrounds, bathroom vanities and urinals. The fastener has a head equipped with tightening features arranged around an inner void that extends from the head down into the shaft. The void functions as a screw drive, allowing for torque to be applied to the screw to tighten it. Known screw drive shapes may be used such as a slot, a Phillips, Pozidriv, Square, Robertson, Hex, Hex socket (Allen), Security hex socket, Torx, Security Torx, Tri-Wing, Spanner head, Clutch, One-way, Double-square, Triple square, Polydrive, Spline drive, Double hex, Bristol, Pentalobular or other known shapes. In certain preferred embodiments, the screw drive is a Phillips head. In preferred embodiments, the void extends about 1" deep, starting from the opening in the head and extending down 1" into the body of the anchor.

In certain embodiments, the void is long enough and wide enough to allow for insertion of caps or other anchors or fasteners. Said tightening features can be temporarily coupled to a complementary drive shaft in order to drive said fastener into the wall. During this penetration of the fastener into the substrate, the helical thread winding around the generally conical fastener shaft translates the rotary motion applied to the fastener head by the drill into a linear translation of the anchor toward the steel stud supporting the wall substrate of wall cladding and millwork. A piercing point at the narrow point of the fastener distal to the head causes the steel stud, when reached, to be pierced and allows the thread to fold over the metal to form a rigid anchor between the thread of the shaft with the newly rimmed perforation in the steel stud. Said penetration of said steel stud may be aided by predrilling of a hole prior to drilling in of the said anchor.

In a preferred embodiment, a wall is prepared by fixing steel studs at top and bottom to form a structure onto which wall cladding can be fixed. Wall cladding is attached to the steel stud by means of conventional fasteners. Using a power driver equipped with a bit that matches the tightening features of the fastener head, the fastener is driven through the back wall of millwork such as a cabinet, through the wall cladding, and piercing the steel stud to form a mate that bears load such as a loaded cabinet.

The anchor may be further pierced through the head by a secondary ordinary fastening screw to provide an anchor within an anchor.

BRIEF DESCRIPTION OF THE DRAWINGS

In the drawings, which illustrate embodiments of the invention:

FIG. 8(a) shows the steel stud as approximately the first ¼ of the anchor has been inserted; FIG. 8(b) shows the steel stud as approximately ½ of the anchor has been inserted; FIG. 8(c) shows the steel stud as approximately ¾ of the anchor has been inserted; and FIG. 8(d) shows the steel stud shows the steel stud with an anchor fully inserted.

DETAILED DESCRIPTION OF THE INVENTION

Figure 1:
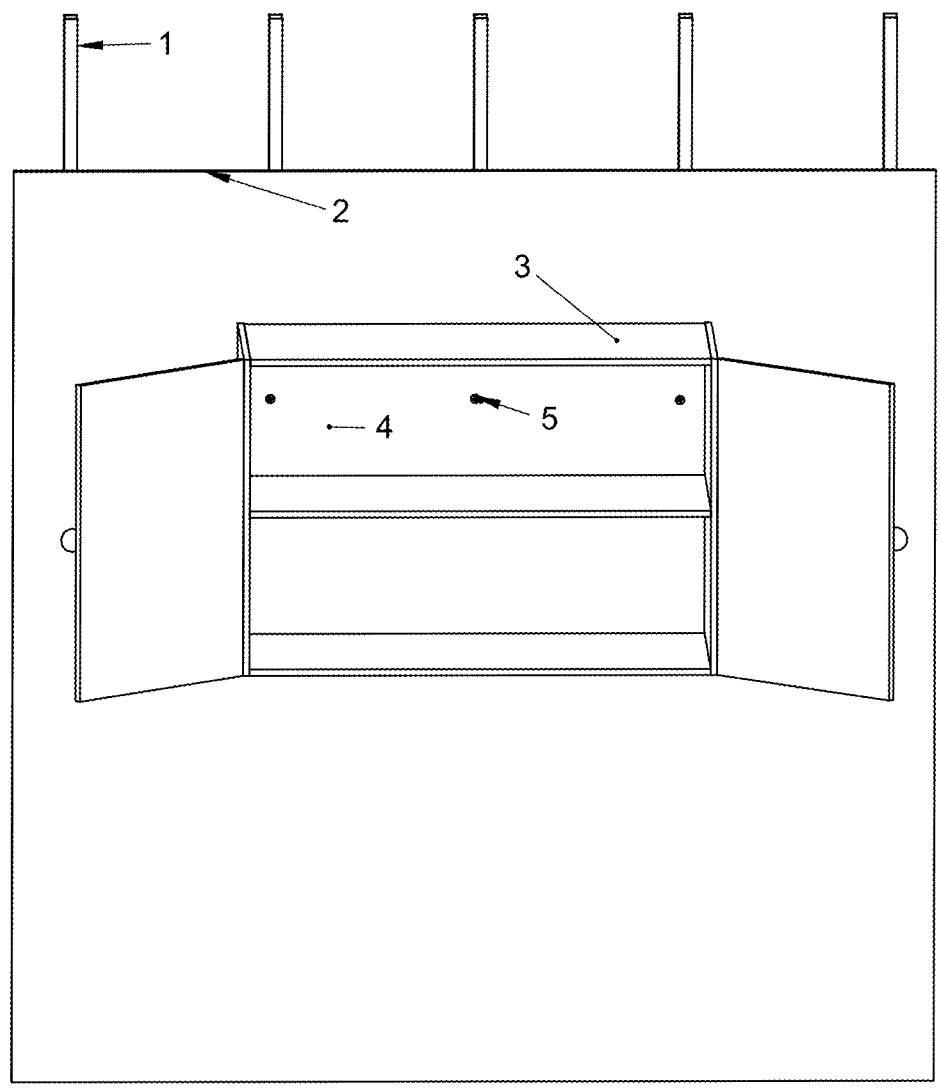
FIG. 1 shows a perspective front view of millwork fastened to a steel stud wall by steel stud anchors.

FIG. 1 shows a perspective isometric view of millwork 3 fastened to a steel stud wall, showing steel studs 1 vertically arranged in a generally regular spacing, and supporting wall cladding 2. Steel stud anchors 5 penetrate the back board 4 of the millwork 3, the rear plane of said backboard being contiguous with the generally vertical plane of the wall cladding 2. In this fashion, the millwork may bear a specific load, exemplified by a kitchen cabinet full of dishes. Other possible types of millwork include bookshelves, television mounts, audio equipment, artwork, mirrors, lighting, drapery, decorative millwork panels, handrails, conduit mounts and duct hangers. The load variable is a function of the wall material. The steel studs generally used in buildings for the erection of interior partitions can vary in thickness from about 0.0179" (18 mils) or 0.455 mm (25 gauge) to about 0.0296" (30 mils) or 0.752 mm (20 gauge) With thicker steel studs, the metal is heavier, sturdier and less malleable, which allows for more weight to be loaded. In certain embodiments, the steel stud anchors are made from nonferrous metals, such as zinc, zinc alloys, copper, and aluminum based alloys. In certain other embodiments, the anchors are made from ferrous metal die castings. In preferred embodiments the steel stud anchor is composed of zinc alloy. In preferred embodiments, the wall material is drywall and steel studs. The gauge of the steel stud can be from about 0.0179" (18 mils) 0.455 mm (25 gauge) to about 0.0296" (30 mils) 0.752 mm (20 gauge) and most preferably about 0.0179" (18 mm).

Although it is theoretically possible to have a stud made of a variety of metals, in view of current building codes, the only steel stud in current use is a zinc-coated steel stud. the zinc is a coating used to protect the steel from oxidization, such that the zinc oxidizes over time but seals in the steel keeping it from breaking down through oxidization or rust. Thus, the zinc coating gives the steel studs a much greater lifespan.

Figure 2:
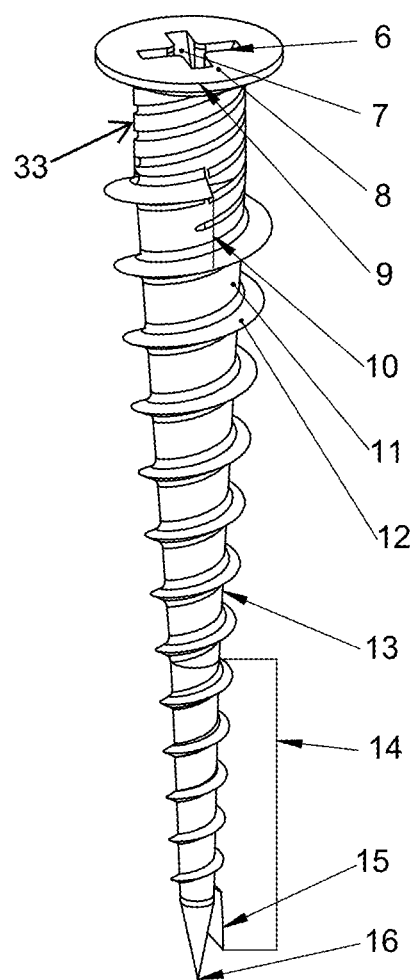
FIG. 2 shows a steel stud anchor in isometric view.

In FIG. 2, a steel stud anchor is shown in isometric view with a central void 6 surrounded by Philips tightening features 7 in the head 8 which is surrounded by a flange 9. A thread 12 with a variable pitch 10 adorns or extends from the shaft 11, the profile 13 of the shaft 11 having an auger zone 14 nearer the cutting blade 15 and piercing tip 16. The auger zone is the stretching out of the hole and the curling of the metal of the stud to the steel stud anchor. With a standard prior art straight screw with a linear pitch, as the screw is inserted past the drywall into the steel stud, the material of the drywall is turned to dust and small debris is caught up in the threads of the screw. As the head of the screw hits the drywall face, it compacts all the debris (nothing has been removed and a screw has been added). This causes an over packing issue and the drywall or millwork will blister from the added pressure. In contrast, the anchor of the present invention has a non-linear taper and variable pitch thread. The fine thread pitch at the tip of the anchor first passes through the drywall and into the steel stud. The pitch on the part of the anchor not yet passed through the drywall and steel stud is larger. Thus, the variable diameter of the anchor increases as the anchor is inserted farther through the drywall and steel stud. The thread then acts as an augur, pushing the dust and debris out of the hole (onto the floor). About ⅓" of the way into the wall, the larger diameter of the threads will have cleared the debris for the smaller (core of the anchor). When the anchor is fully inserted through the drywall and steel stud, it bottoms out with the head of the anchor flush against the drywall, such that there is no over packing issue.

As explained above, the thread pitch" describes the number of rotations of the thread per linear unit of shaft length. The thread of the present invention preferably has a "non-linear" pitch, wherein the thread count varies along the long axis of the fastener shaft. Similarly, the thread profile of the anchor (i.e. the cross-sectional shape and dimensions of the thread ridge as it winds around the shaft) is also preferably non-uniform along the thread helix. The non-linear thread pitch and the non-uniform thread profile helps the anchor wedge its way in to the steel stud and prevents the thin metal of the steel stud from jumping over the threads of the anchor so they do not strip. It also gradually forms and enlarges the steel stud hole in a manner that increases its strength as an anchor point.

Figure 3A:
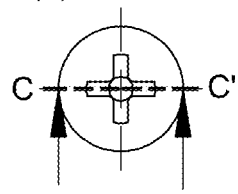
FIG. 3(a) is a top view of the steel stud anchor.
Figure 3B:
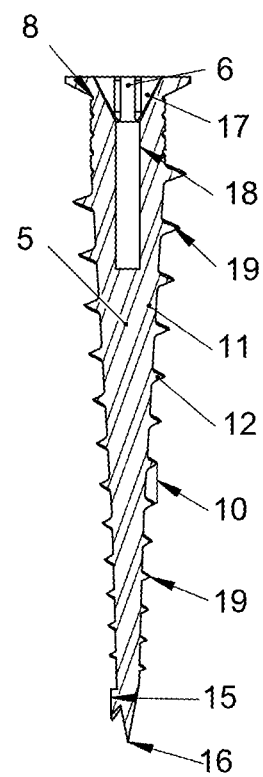
FIG. 3(b) is a cross-sectional view of the anchor of FIG. 3(a) along line C-C'.

In FIG. 3(a), a top view of a steel stud anchor of the present invention is shown. FIG. 3(b) shows a cross-sectioned view of the steel stud anchor to reveal the inner profile of the anchor. A vertical cross-section of the top view reveals a tightening end or head 8 containing a void 6 defined by a bore wall 18 equipped with tightening features 17 along a portion of the void 6. A cutting thread 12 with non-linear pitch 10 adorns, or extends from, the anchor shaft 11. A slightly grooved secondary thread 33 is located from the top of the cutting thread up to the head of the anchor. The shaft itself has a non-linear progression of diameter along the shaft 11; similarly the thread profile 19 varies along the length of the shaft. A cutting blade 15 located on the end of the shaft 11 near the piercing point 16 to cuts and scoops away detritus. The piercing point 16 is able to penetrate the steel stud, with or without use of a pilot hole.

Figure 4A:
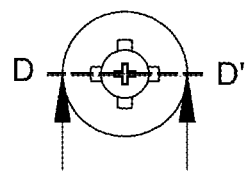
FIG. 4(a) is a top view of the anchor penetrated by a secondary screw.
Figure 4B:
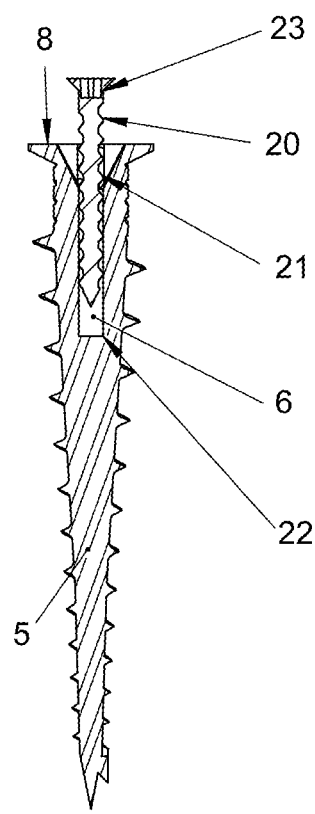
FIG. 4(b) is a cross-sectional view of the anchor and screw of FIG. 4(a) along line D-D'.

FIG. 4(a) is a top view of an anchor of the present invention which has been penetrated by a secondary screw. FIG. 4(b) shows a cross-section view of a steel stud anchor of the present invention which has been penetrated by a secondary screw 20 and in which the details of the mating of these two pieces is illustrated. The steel stud anchor 5 can anchor in a steel stud wall, with or without intervening millwork, to form wall anchors upon which objects may be hung, for example, a painting or television, by penetrating the void (i.e. the hole in the center of the head of the screw) 6 formed in the head 8 of the steel stud anchor 5 with a secondary screw 20 with a thread 21 to form a load-bearing thread mate. The travel of the secondary screw 20 within the anchor 5 is limited by the depth 22 of the anchor void 6, or by collision of the secondary screw head 23 with the head 8 of the steel stud anchor 5.

Figure 5A:
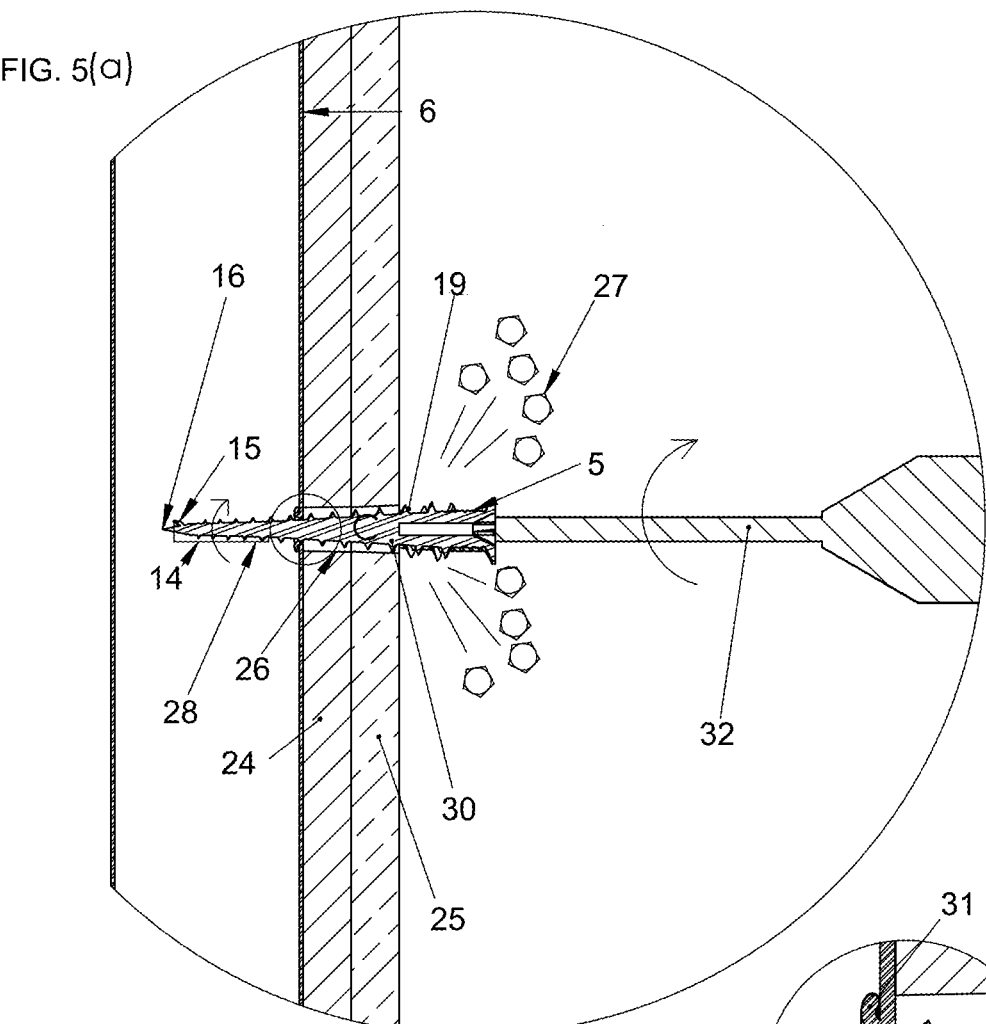
FIG. 5(a) is a cross-sectional side view showing penetration of the anchor into the millwork and wall cladding.
Figure 5B:
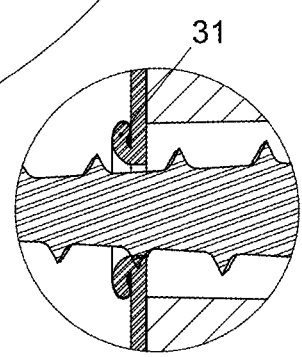
FIG. 5(b) is a portion of the view of the rim formed in the steel stud wall of FIG. 5(a) enlarged for magnification purposes.

In the lateral cross-section presented in FIG. 5, penetration of a millwork surface 30 to make a perforation 26 by an anchor 5 into the millwork 25 and wall cladding 24 results in loose detritus 27. Alternately, said perforation can be pre-drilled. Said detritus 27 is augered out and away from the conical perforation 26 in the millwork 25 and the wall cladding 24, preventing over-packing of the resulting mate. Said over-packing can result in an undesirable bulge that separates the millwork 25 from the wall cladding 24 to which said millwork is supposed to be contiguous. The steel stud anchor comprises an auger zone 14 proximal to the anchor tip 16, and a wedge zone 28 distal to the tip 16. A power drill 32 can provide the driving power to insert the anchor. In FIG. 5(b), the bending back of the stainless steel sheet folded into the stud is shown in detail, where a rim 31 can be seen to be formed under the influence of the attack. The rim reinforces the mate (i.e., the secure fixation of the anchor and the steel stud 1)

Figure 6:
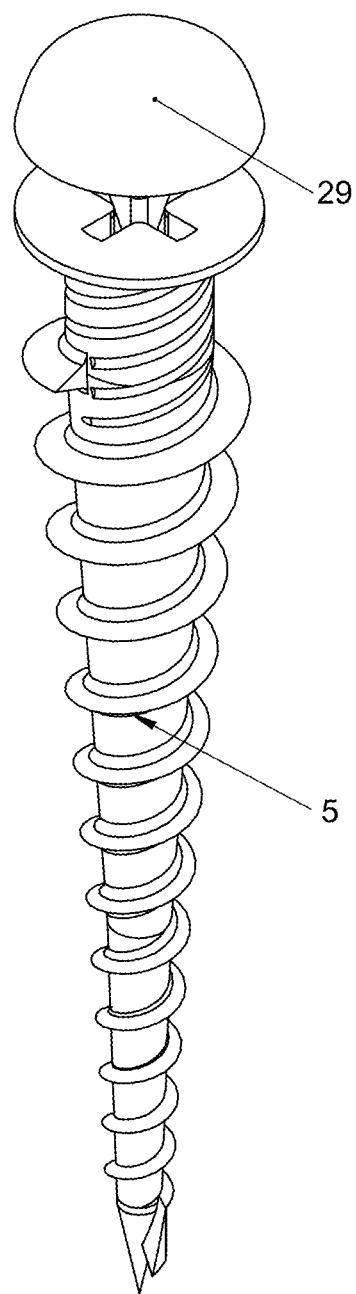
FIG. 6 shows an isometric view of a finishing cap to be pressed into the void of the anchor head.

In certain embodiments, the steel stud anchor 5 may have a press-fit finishing cap. This is shown in FIG. 6.

In certain embodiments, the steel stud anchor of the present invention is made of Zinc, zinc alloys, copper and aluminum alloys. In certain preferred embodiments, the metal alloy is zinc or a zinc alloy and in certain most preferred embodiments, the zinc is pre-hardened by the losso hardening process, allowing for die-casting of the anchors, instead of machining, as is necessary with steel stud fasteners.

In preferred embodiments of the present invention, the steel stud anchor is 3.5" or 8.9 cm in length. In certain preferred embodiments, the diameter of the head of the steel stud anchor is preferably about 17 mm or 21/32" (or 0.65") across the head. In certain preferred embodiments, the shaft directly below the head is ⅜" or 9.5 mm in diameter. In preferred embodiments, the maximum thread height near the top of the shaft (i.e. closer to the head) is approximately 3/16". At this same point, the thread is approximately ⅛" thick. The minimum thread height near the tip is approximately 1/16". At this point, the thread is approximately 1/16" wide. The heights and spacing are described by formula 1 (in formula 1, they are described as decimals, rather than fractions of an inch).

Figure 7:
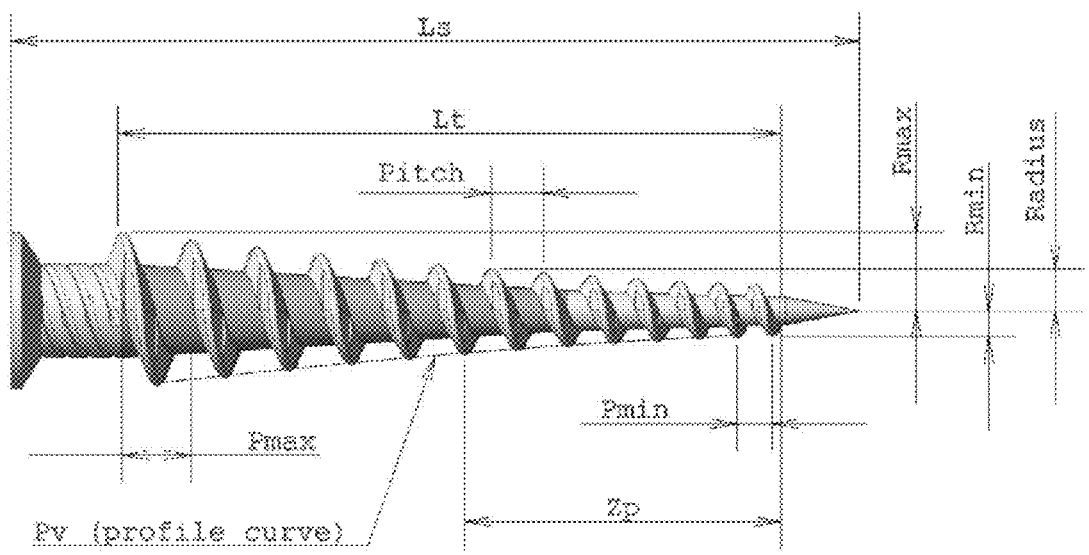
FIG. 7 shows a representation of the anchor of the present invention indicating how the Radius and Pitch of the steel stud anchor at a point Zp along the thread (in FIG. 7, Zp is illustrated approximately half way along the thread) can be calculated with Formula I set out in the Detailed
Figure 8A:
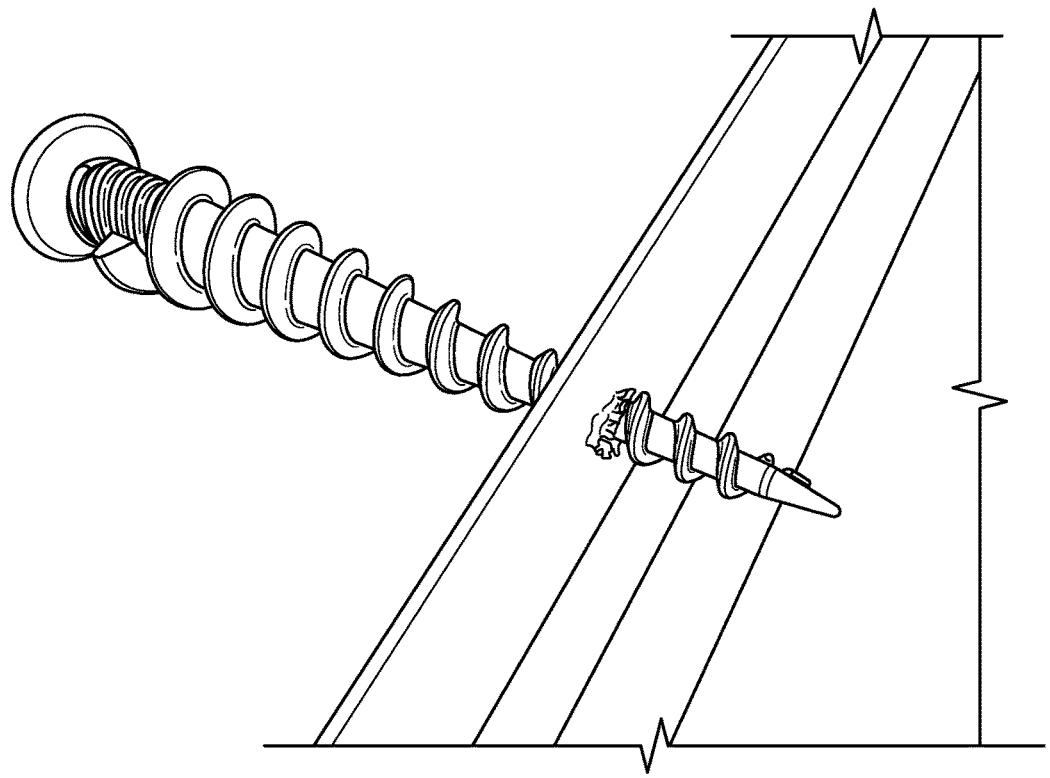
FIGS. 8(a), 8(b), 8(c) and 8(d) are a series of photographs of a steel stud after insertion of the steel stud anchor of the present invention as it is progressively threaded into the steel stud to demonstrate the progression of a steel stud anchor through a steel stud.
Figure 8B:
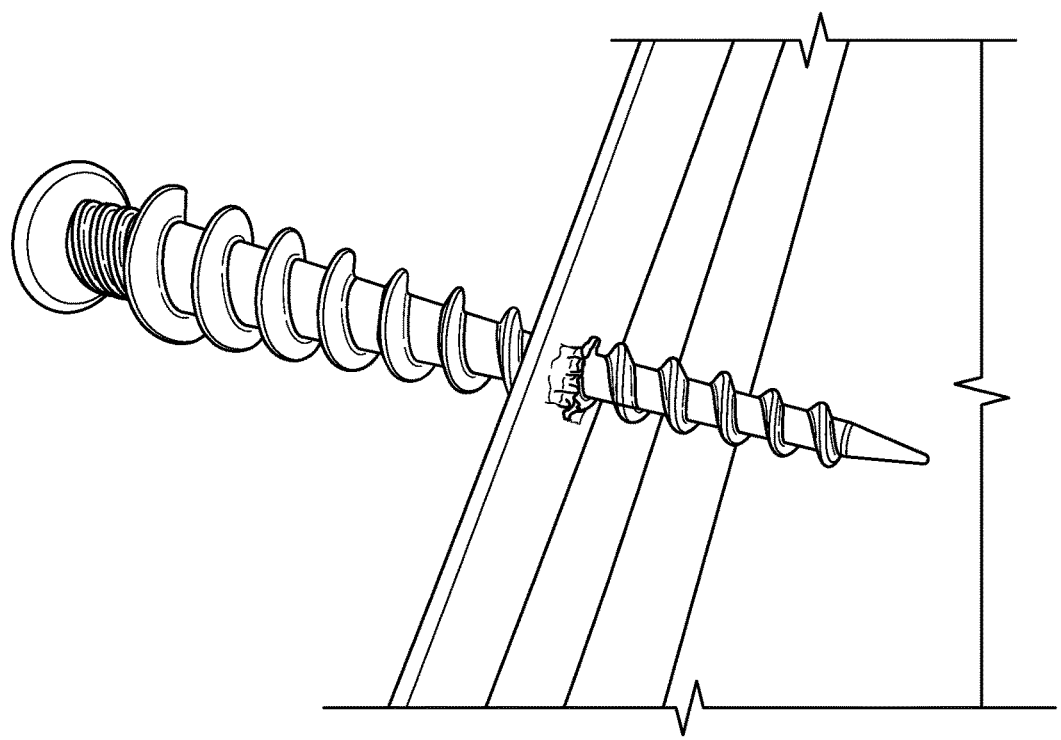
Figure 8C:
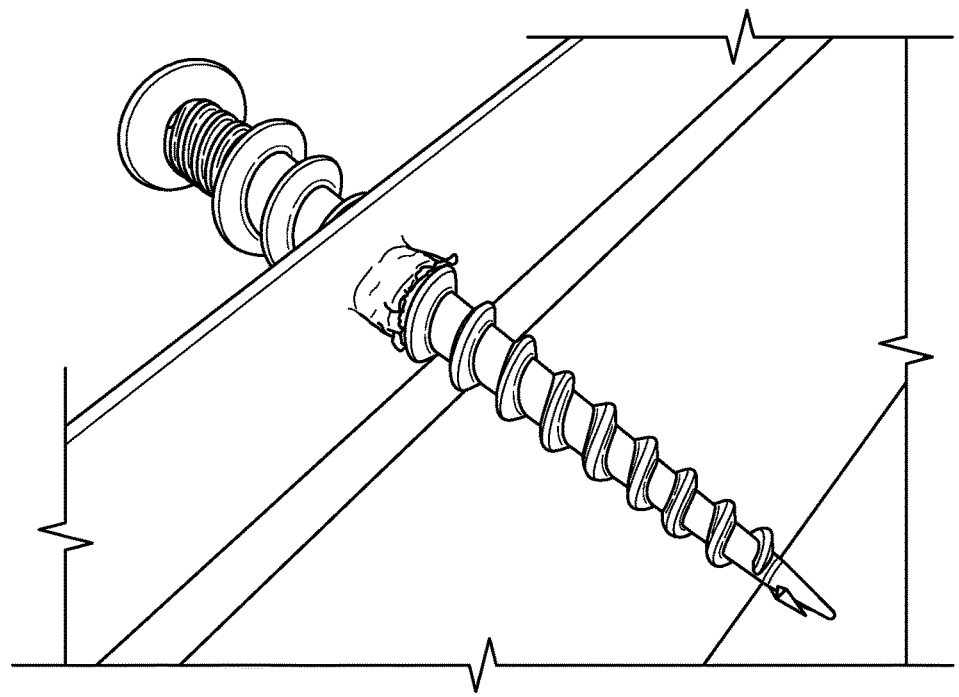
Figure 8D:
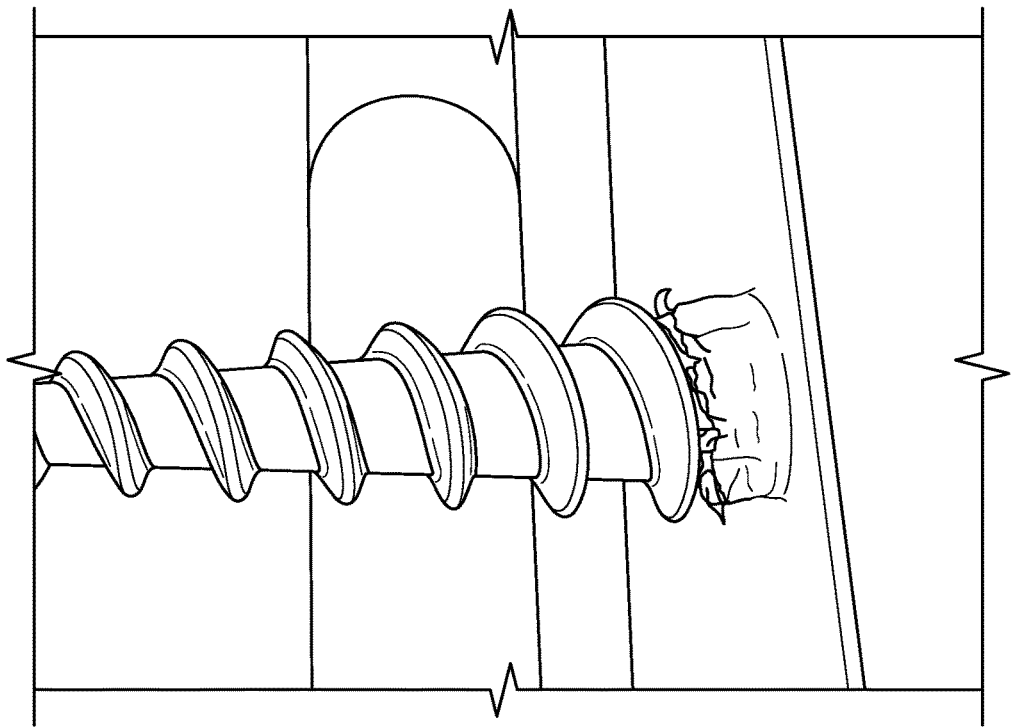

The taper and thread frequency follow the relationship shown in FIG. 7.

As illustrated in FIG. 7, and in accordance with an embodiment of the present invention, the Radius and Pitch of the steel stud anchor at a point Zp along the thread (in FIG. 7, Zp is illustrated approximately half way along the thread) can be calculated with Formula I below:

$$\text{Radius} = ((Z_p/L_t)^{P_v} \times (R_{max} - R_{min})) + R_{min} \quad \text{Formula I}$$

$$\text{Pitch} = ((Z_p/L_t) \times (P_{max} - P_{min})) + P_{min} \quad \text{Formula II}$$

Variables $Z_p$=The Position along the thread you want to know the radius or Pitch $L_t$=The Length of the threaded section (in our example $L_t$=2.75")

$L_t \geq 1.0$" $L_t \leq 3.5$"

$R_{max}$=Maximum Radius of the thread measured from a centerline through the shaft at the head end of the anchor. (In our example $R_{max}$=0.3125")

$R_{max} \geq 0.125$" $R_{max} \leq 0.375$"

$R_{min}$=Minimum Radius of the thread measured from a centerline through the shaft at the tip of the anchor (In our example $R_{min}$=0.0925")

$R_{min} > 0.040$" $R_{min} \leq 0.1875$"

$P_{max}$=Maximum Pitch at the head end of the anchor (In our example $P_{max}$=0.3125")

$P_{max} \geq 0.1875$" $P_{max} \leq 0.625$"

$P_{min}$=minimum Pitch at the tip end of the anchor (In our example $P_{min}$=0.125")

$P_{min} \geq 0.040$" $P_{min} \leq 0.1875$"

$P_v$=Power value that creates (In our example $P_v$=2.0)

$P_v \geq 1.0$ $P_v \leq 5.0$

FIGS. 8(a)-8(d) are a series of photographs of a steel stud after insertion of the steel stud anchor of the present invention as it is progressively threaded into the steel stud. The photographs show the increasing bending back and/or curling of the hole opening in the steel stud which is folded into the stud, with an increasing rim seen as the anchor is inserted further into the stud. The bit of curled metal behind the steel stud makes it extremely difficult to pull the anchor out or for it to come loose. This is because the folding of the metal makes it far stronger near the fold and makes it nearly impossible to pull the anchor out or for it to come loose.

Figure 9:
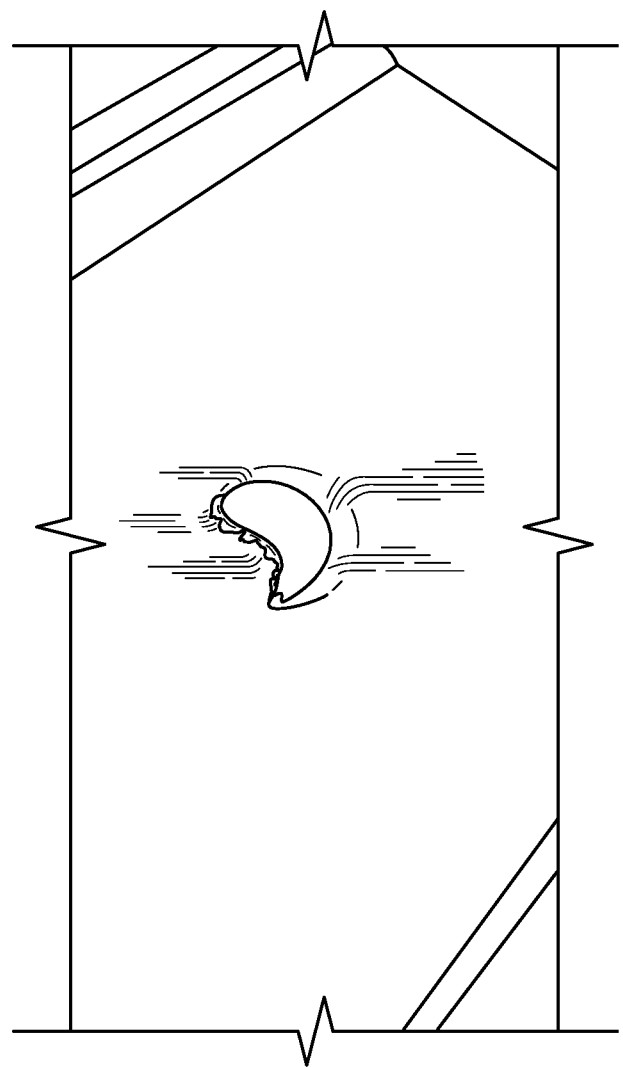
FIG. 9 shows a picture of a steel stud that has had the steel stud anchor of the present invention screwed into it and then removed to show how the thread of the anchor forms an extrusion for more holding strength.

FIG. 9 shows a picture of a steel stud that has had the steel stud anchor of the present invention screwed into it and then removed to show how the thread of the anchor forms an extrusion for more holding strength. As can be seen, when the anchor is threaded into the hole, the hole is slowly stretched out while the displaced metal of the steel stud is curled into a ring tightly around the anchor. The hole is not circular but it slightly elongated to one side and as the anchor is inserted through the hole, there is a forming of the material of the steel stud on the back side which increases the contact area of steel stud on the thread and ultimately results with full or almost full contact completely around the thread.

The steel stud anchor of the present invention can be used for hanging cabinets by using the anchor to drill through the cabinet, drywall and into the steel stud, for French cleats by drilling through the cleat, drywall and into the steel stud, for shelving by drilling through the drywall and into the steel stud, and then using a screw to fasten the shelving to steel stud anchor. Simply explained, when it is desired to affix something to a wall, e.g. a shelf bracket, it is possible to drill a pilot hole, then screw the steel stud anchor of the present invention into the wallboard after which the small bracket hole would be lined up over the anchor and a then a #8 or #10 convention screw (either wood or metal) could be threaded into the steel stud anchor of the present invention. Window treatments can also be made by drilling through the mounting plate, drywall and into steel stud and then using a screw to fasten the mounting plate to steel stud anchor. The steel stud anchor can also be used to hand televisions, speakers, artwork, mirrors and any other heavy object to be mounted to a wall surface.

Figure 10:
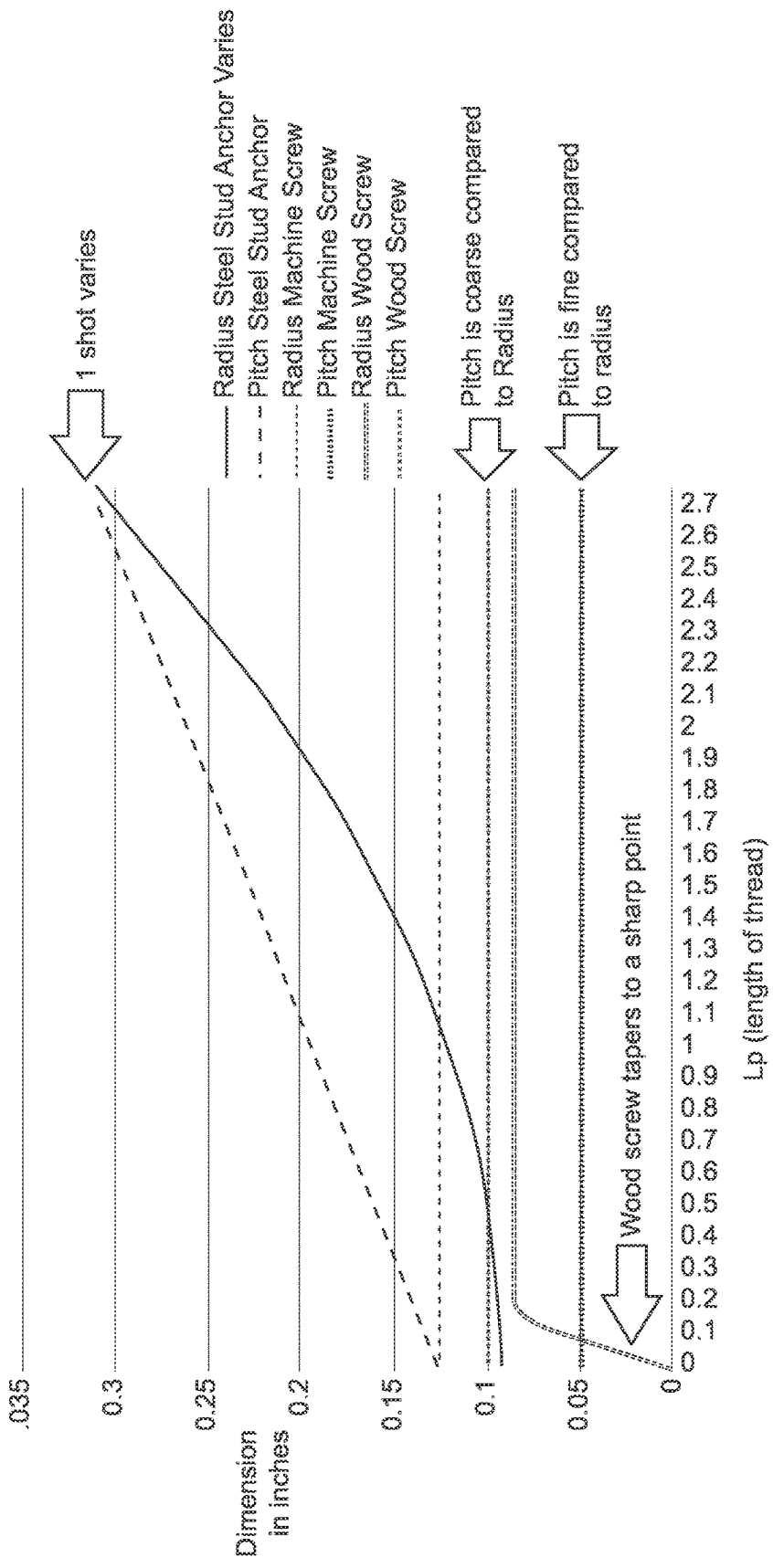
FIG. 10 is a chart comparing the steel stud anchor of the present invention to a Machine screw and a typical wood deck screw by showing the relationship of the length of the threaded section versus the radius and length versus pitch.

FIG. 10 is a chart comparing the steel stud anchor of the present invention to a Machine screw and a typical wood deck screw by showing the relationship of the length of the threaded section versus the radius and length versus pitch. The data for this chart is present below in Table 1.

TABLE 1

| Lp | Radius (steel stud anchor) | Pitch 1Shot | ¼-20 Machine Screw Radius Machine Screw | Pitch Machine Screw | Wood deck Screw #8 Radius Wood Screw | Pitch Wood Screw |
|---|---|---|---|---|---|---|
| 0 | 0.0925 | 0.125 | 0.125 | 0.05 | 0 | 0.1 |
| 0.05 | 0.092572727 | 0.128409091 | 0.125 | 0.05 | 0.025 | 0.1 |
| 0.1 | 0.092790909 | 0.131818182 | 0.125 | 0.05 | 0.055 | 0.1 |
| 0.15 | 0.093154545 | 0.135227273 | 0.125 | 0.05 | 0.075 | 0.1 |
| 0.2 | 0.093663636 | 0.138636364 | 0.125 | 0.05 | 0.085 | 0.1 |
| 0.25 | 0.094318182 | 0.142045455 | 0.125 | 0.05 | 0.085 | 0.1 |
| 0.3 | 0.095118182 | 0.145454545 | 0.125 | 0.05 | 0.085 | 0.1 |
| 0.35 | 0.096063636 | 0.148863636 | 0.125 | 0.05 | 0.085 | 0.1 |
| 0.4 | 0.097154545 | 0.152272727 | 0.125 | 0.05 | 0.085 | 0.1 |
| 0.45 | 0.098390909 | 0.155681818 | 0.125 | 0.05 | 0.085 | 0.1 |
| 0.5 | 0.099772727 | 0.159090909 | 0.125 | 0.05 | 0.085 | 0.1 |
| 0.55 | 0.1013 | 0.1625 | 0.125 | 0.05 | 0.085 | 0.1 |
| 0.6 | 0.102972727 | 0.165909091 | 0.125 | 0.05 | 0.085 | 0.1 |
| 0.65 | 0.104790909 | 0.169318182 | 0.125 | 0.05 | 0.085 | 0.1 |
| 0.7 | 0.106754545 | 0.172727273 | 0.125 | 0.05 | 0.085 | 0.1 |
| 0.75 | 0.108863636 | 0.176136364 | 0.125 | 0.05 | 0.085 | 0.1 |
| 0.8 | 0.111118182 | 0.179545455 | 0.125 | 0.05 | 0.085 | 0.1 |
| 0.85 | 0.113518182 | 0.182954545 | 0.125 | 0.05 | 0.085 | 0.1 |
| 0.9 | 0.116063636 | 0.186363636 | 0.125 | 0.05 | 0.085 | 0.1 |
| 0.95 | 0.118754545 | 0.189772727 | 0.125 | 0.05 | 0.085 | 0.1 |
| 1 | 0.121590909 | 0.193181818 | 0.125 | 0.05 | 0.085 | 0.1 |
| 1.05 | 0.124572727 | 0.196590909 | 0.125 | 0.05 | 0.085 | 0.1 |
| 1.1 | 0.1277 | 0.2 | 0.125 | 0.05 | 0.085 | 0.1 |
| 1.15 | 0.130972727 | 0.203409091 | 0.125 | 0.05 | 0.085 | 0.1 |
| 1.2 | 0.134390909 | 0.206818182 | 0.125 | 0.05 | 0.085 | 0.1 |
| 1.25 | 0.137954545 | 0.210227273 | 0.125 | 0.05 | 0.085 | 0.1 |
| 1.3 | 0.141663636 | 0.213636364 | 0.125 | 0.05 | 0.085 | 0.1 |
| 1.35 | 0.145518182 | 0.217045455 | 0.125 | 0.05 | 0.085 | 0.1 |
| 1.4 | 0.149518182 | 0.220454545 | 0.125 | 0.05 | 0.085 | 0.1 |
| 1.45 | 0.153663636 | 0.223863636 | 0.125 | 0.05 | 0.085 | 0.1 |
| 1.5 | 0.157954545 | 0.227272727 | 0.125 | 0.05 | 0.085 | 0.1 |
| 1.55 | 0.162390909 | 0.230681818 | 0.125 | 0.05 | 0.085 | 0.1 |
| 1.6 | 0.166972727 | 0.234090909 | 0.125 | 0.05 | 0.085 | 0.1 |
| 1.65 | 0.1717 | 0.2375 | 0.125 | 0.05 | 0.085 | 0.1 |
| 1.7 | 0.176572727 | 0.240909091 | 0.125 | 0.05 | 0.085 | 0.1 |
| 1.75 | 0.181590909 | 0.244318182 | 0.125 | 0.05 | 0.085 | 0.1 |
| 1.8 | 0.186754545 | 0.247727273 | 0.125 | 0.05 | 0.085 | 0.1 |
| 1.85 | 0.192063636 | 0.251136364 | 0.125 | 0.05 | 0.085 | 0.1 |
| 1.9 | 0.197518182 | 0.254545455 | 0.125 | 0.05 | 0.085 | 0.1 |
| 1.95 | 0.203118182 | 0.257954545 | 0.125 | 0.05 | 0.085 | 0.1 |
| 2 | 0.208863636 | 0.261363636 | 0.125 | 0.05 | 0.085 | 0.1 |
| 2.05 | 0.214754545 | 0.264772727 | 0.125 | 0.05 | 0.085 | 0.1 |
| 2.1 | 0.220790909 | 0.268181818 | 0.125 | 0.05 | 0.085 | 0.1 |
| 2.15 | 0.226972727 | 0.271590909 | 0.125 | 0.05 | 0.085 | 0.1 |
| 2.2 | 0.2333 | 0.275 | 0.125 | 0.05 | 0.085 | 0.1 |
| 2.25 | 0.239772727 | 0.278409091 | 0.125 | 0.05 | 0.085 | 0.1 |
| 2.3 | 0.246390909 | 0.281818182 | 0.125 | 0.05 | 0.085 | 0.1 |

TABLE 1-continued

| Lp | Radius (steel stud anchor) | Pitch 1Shot | ¼-20 Machine Screw Radius Machine Screw | Pitch Machine Screw | Wood deck Screw #8 Radius Wood Screw | Pitch Wood Screw |
|---|---|---|---|---|---|---|
| 2.35 | 0.253154545 | 0.285227273 | 0.125 | 0.05 | 0.085 | 0.1 |
| 2.4 | 0.260063636 | 0.288636364 | 0.125 | 0.05 | 0.085 | 0.1 |
| 2.45 | 0.267118182 | 0.292045455 | 0.125 | 0.05 | 0.085 | 0.1 |
| 2.5 | 0.274318182 | 0.295454545 | 0.125 | 0.05 | 0.085 | 0.1 |
| 2.55 | 0.281663636 | 0.298863636 | 0.125 | 0.05 | 0.085 | 0.1 |
| 2.6 | 0.289154545 | 0.302272727 | 0.125 | 0.05 | 0.085 | 0.1 |
| 2.65 | 0.296790909 | 0.305681818 | 0.125 | 0.05 | 0.085 | 0.1 |
| 2.7 | 0.304572727 | 0.309090909 | 0.125 | 0.05 | 0.085 | 0.1 |
| 2.75 | 0.3125 | 0.3125 | 0.125 | 0.05 | 0.085 | 0.1 |

As can be seen from both Table 1 and FIG. 10, the steel stud anchor of the present invention has a linear thread pitch but it is on a slope, indicating that it is getting larger. The steel stud anchor of the present invention gets larger in a linear fashion. In contrast, and as seen on the chart, a wood screw and machine screw have a constant linear pitch. When a comparison is made of the radius of the threads versus the length of the steel stud anchor of the present invention, a curve of non-linear sizes are plotted. In contrast, those of a wood or machine screw are constant, with the exception of the wood screw that has a pointed tip for centering and entering wood. The combination of a linear, but increasing, pitch coupled with a non-linear concave curved profile helps form the steel stud as the steel stud anchor passes through it, providing for more strength.

What is claimed:

1. A metal steel stud anchor for use with a steel stud comprising a head, a shaft and a pointed tip:
wherein the shaft is conically shaped and extends from the head to the pointed tip, with the shaft having a top grooved zone adjacent to the head and a threaded portion adjacent to the grooved zone and extending to the pointed tip, said threaded portion having an auger zone proximal to the pointed tip having threads for stretching a hole in the steel stud and pushing debris out of the way as the anchor is inserted through the steel stud and a wedge zone proximal to the auger zone for further enlarging the hole in the steel stud, said wedge zone having threads for forming an increasing rim around the hole in the steel stud formed by the folding of the steel stud material to wedge the anchor in the steel stud and prevent the steel stud from jumping over threads of the threaded portion so it does not strip the steel stud anchor, wherein the shaft diameter has a non-linear progression along the length of the shaft, and wherein the threads extend in a non-linear pitch around the length of the shaft in a linear progression and wherein the head has a central void, wherein the central void extends into the shaft.

2. The anchor of claim 1, wherein a pitch and a radius of the thread is defined by Formula I and Formula II as follows:

Radius=$((Zp/Lt)Pv \times (Rmax-Rmin))+Rmin$   Formula I

Pitch=$((Zp/Lt) \times (Pmax-Pmin))+Pmin$   Formula II wherein Zp is a Position along the thread,
Lt is a Length of the threaded section of the shaft,
Rmax is a Maximum Radius of the thread measured from a centerline through the shaft at a head end of the anchor,
Rmin is a Minimum Radius of the thread measured from a centerline through the shaft at a tip of the anchor,
Pmax is a Maximum Pitch at the head end of the anchor,
Pmin is a minimum Pitch at an end of the pointed tip of the anchor
Pv is a Power value.

3. The anchor of claim 2, wherein Lt≥1.0" Lt≤3.5, Rmax≥0.125" Rmax≤0.375", Rmin>0.040" Rmin≤0.1875", Pmax≥0.1875" Pmax≤0.625, Pmin≥0.040" Pmin≤0.1875", and Pv≥1.0 Pv≤5.0.

4. The anchor of claim 1, wherein the anchor is fit with a press fit finishing cap.

5. The anchor of claim 1, wherein the steel stud anchor is made of zinc or a zinc alloy.

6. The anchor of claim 5, wherein the zinc is prehardened.

7. The anchor of claim 1, wherein the shaft includes a blade for clearing away debris from the hole.

8. The anchor of claim 7, wherein the blade is a small sharp flange that sits just adjacent and slightly recessed up the shaft from the pointed tip.

9. The anchor of claim 1, wherein the diameter of the shaft directly below the head is about ⅜" in diameter.

10. The anchor of claim 1, wherein the diameter of the head is about 21/32".

11. The anchor of claim 1, wherein the maximum thread height occurs adjacent to the top grooved zone and the maximum thread height is about 3/16".

12. The anchor of claim 1, wherein the thread is about ⅛" thick at the location of its maximum thread height.

13. The anchor of claim 1, wherein the minimum thread height occurs in the top grooved zone adjacent to the pointed tip of the anchor and is about 1/16".

14. The anchor of the claim 1, wherein the thread is about 1/16" thick at the location of its minimum thread height.

15. The anchor of claim 1, wherein the overall length of the anchor is approximately 3.5".

16. The anchor of claim 1, wherein the height of the head of the anchor is about ⅛".

17. The anchor of claim 1, having a top grooved zone extending about ½" and a length of the threaded portion of the shaft of about 2.75" long and a length of the pointed tip of about ⅛" long.

18. The anchor of claim 1, wherein the anchor is approximately 3.5" long, the top grooved zone is about ⅛" long, the threaded portion of the shaft is about ⅝" to about 3.375" long, and the pointed tip is from about 3.375" to about 3.5" long.

19. The anchor of claim 1, wherein the shaft includes a blade which is rectangular in shape and is located generally perpendicular to the axis of the shaft and is further located on the thread adjacent to the pointed tip.

20. The anchor of claim 1, wherein the anchor is concentrically penetrated by a generally conical central void partly extruding into the shaft from the head of the anchor, said conical central void extending approximately 1" from the head into the shaft such that the conical central void extends through about 28% of the length of the shaft, with the remaining about 72% of the shaft being solid and wherein a secondary screw can be threaded into said conical central void.

21. The anchor of claim 1, wherein the height of the head of the anchor is about 1/8".

22. The anchor of claim 1, wherein the anchor is approximately 3.5" long and wherein the threaded portion of the shaft is about 5/8" to about 3.375" long, the pointed tip extends from about 3.375" to about 3.5", and the top grooved zone extends from about 1/8" to about 1/2".

23. The anchor of claim 1, wherein the hole in the steel stud anchor is made with the tip of the anchor.

24. An anchoring metal fastener comprising:
a fastener head equipped with tightening features around a central void
a threaded, generally conical shaft with curved sides in cross-section that meet at a tip,
a linear progression in thread pitch along the length of the shaft,
a thread profile that changes with position along the thread,
a non-linear progression of shaft diameter along the length of the shaft,
a piercing point at the distal end of the generally conical shaft
wherein the threaded shaft has an auger zone proximal to the tip having threads for stretching a hole in the steel stud and for pushing debris out of the way as the fastener is inserted through the steel stud and has a wedge zone proximal to the auger zone for further enlarging a hole in the steel stud and having threads for forming an increasing rim around the hole in the steel stud formed from the steel stud material to wedge the anchor in the steel stud and prevent it from jumping over threads of the threaded shaft so it does not strip the steel stud anchor.

25. A metal steel stud anchor for use with a steel stud comprising a head, a shaft and a pointed tip:
wherein the shaft is conically shaped and extends from the head to the pointed tip, with the shaft having a top grooved zone adjacent to the head and a threaded portion adjacent to the grooved zone and extending to the pointed tip, wherein the shaft diameter has a non-linear progression along the length of the shaft, and
wherein the threads extend in a non-linear pitch around the length of the shaft in a linear progression and wherein the head has a central void, wherein the central void extends into the shaft and wherein the shaft has a concave curved profile.

26. The anchor of claim 25, having a top grooved zone extending about 1/2" and a length of the threaded portion of the shaft of about 2.75" long and a length of the pointed tip of about 1/8" long.

27. The anchor of claim 25, wherein the anchor is approximately 3.5" long and wherein the threaded portion of the shaft is about 5/8" to about 3.375" long, the pointed tip extends from about 3.375" to about 3.5", and the top grooved zone extends from about 1/8" to about 1/2".

28. The anchor of claim 25, wherein the steel stud anchor is made of zinc or a zinc alloy.

29. The anchor of claim 25, wherein the zinc is pre-hardened.

30. The anchor of claim 25, wherein a pitch and a radius of the thread is defined by Formula I and Formula II as follows:

$$\text{Radius} = ((Zp/Lt)Pv \times (Rmax - Rmin)) + Rmin \quad \text{Formula I}$$

$$\text{Pitch} = ((Zp/Lt) \times (Pmax - Pmin)) + Pmin \quad \text{Formula II}$$

wherein Zp is a Position along the thread,
Lt is a Length of the threaded section of the shaft,
Rmax is a Maximum Radius of the thread measured from a centerline through the shaft at a head end of the anchor,
Rmin is a Minimum Radius of the thread measured from a centerline through the shaft at a tip of the anchor,
Pmax is a Maximum Pitch at the head end of the anchor,
Pmin is a minimum Pitch at an end of the pointed tip of the anchor
Pv is a Power value.

31. The anchor of claim 30, wherein Lt≥1.0" Lt≤3.5, Rmax≥0.125" Rmax≤0.375", Rmin>0.040" Rmin≤0.1875", Pmax≥0.1875" Pmax≤0.625, Pmin≥0.040" Pmin≤0.1875", and Pv≥1.0 Pv≤5.0.

32. The anchor of claim 25, wherein the height of the head of the anchor is about 1/8".

* * * * *

UNITED STATES PATENT AND TRADEMARK OFFICE
CERTIFICATE OF CORRECTION

| | | |
|---|---|---|
| PATENT NO. | : 9,593,705 B2 | Page 1 of 1 |
| APPLICATION NO. | : 14/632966 | |
| DATED | : March 14, 2017 | |
| INVENTOR(S) | : Franklin Jiri Call and Mark Robbeson | |

It is certified that error appears in the above-identified patent and that said Letters Patent is hereby corrected as shown below:

On the Title Page

Item (73) "assignees" should be deleted.

Signed and Sealed this
Twelfth Day of May, 2020

Andrei Iancu
*Director of the United States Patent and Trademark Office*